March 10, 1942. C. M. DENNIS 2,275,844
METHOD AND MEANS FOR AUTOMATIC REGULATION
Filed June 1, 1938 4 Sheets-Sheet 1

INVENTOR
Clark M. Dennis

March 10, 1942.                C. M. DENNIS                 2,275,844
              METHOD AND MEANS FOR AUTOMATIC REGULATION
              Filed June 1, 1938           4 Sheets-Sheet 2

INVENTOR
Clark M. Dennis

Patented Mar. 10, 1942

2,275,844

UNITED STATES PATENT OFFICE 2,275,844

METHOD AND MEANS FOR AUTOMATIC REGULATION

Clark M. Dennis, Montclair, N. J.

Application June 1, 1938, Serial No. 211,171

10 Claims. (Cl. 236—86)

My invention relates to improvements in methods and apapratus for automatic control of temperature and other conditions.

More particularly, my invention relates to improvements in methods and apparatus for automatic control when lag, or delayed response, in one or more parts of the process and measuring system, is present to an extent which prevents accurate control by ordinary methods.

As a part of the foregoing, my invention includes methods and apparatus by means of which rate of change and/or changes in rate of change may be accurately measured and controlled.

In a previous application No. 740,586, filed August 20, 1934, now Patent No. 2,140,933 I have disclosed and claimed new means for determining rate of change, in a measured and controlled condition, together with improved means for applying a rate of change function in automatic control of lagging processes. My present invention includes improvements on the methods and mechanisms of the prior application.

The control means herein disclosed are, to a large extent, independent of the nature of the condition which is being controlled. Conventional elements which are responsive to changes in temperature, or pressure, or liquid level, or other condition, may be employed to actuate the mechanisms of my invention. Except as to details of construction, and adjustments desirable to meet varying requirements, the operation of the control mechanisms is much the same without regard to the nature of the condition which actuates the responsive element.

The known and commonly used forms of instrument for automatically controlling process conditions employ what is ordinarily termed a "throttling" action, to effect regulation of the corrective supply. Depending upon requirements, throttling may be used with or without a secondary corrective effect known to those skilled in the art as "reset."

In ordinary throttling the setting of the corrective supply valve, or equivalent mechanism, and the application of the corrective agent, are varied in approximate proportional relation to the amount of departure of the controlled condition from some predetermined level. If an oven is being heated by automatically controlled gas flame, for example, the gas valve is proportionately opened as the temperature drops under an increase in load. Maximum opening and gas supply are reached at some reduced temperature, the value of which depends upon the instrument adjustment.

If lag in the system causes further drop in temperature, before the maximum correction of gas supply can react through the system to bring the temperature back within required range, there is no further corrective action until the temperature has again risen to the same value at which maximum valve opening was reached. Any further rise of temperature above this value will cause the valve to start closing, the valve position at any moment being again determined by the measured value of the temperature in relation to some predetermined level. With instrument setting as commonly used, the valve opening will increase and decrease, through diminishing cycles, until equilibrium is gained between gas supply and the increased thermal load.

Similar but opposite action will take place when the load is decreased. Small changes in load may not cause the application of corrective supply to reach maximum or minimum limits, but diminishing cyclic variations of valve setting and temperature value, during corrective adjustment, are characteristic.

The amount of change in temperature necessary to cause the valve to move from minimum to maximum opening is ordinarily termed the "throttling range." In the better instruments the width of this range, as well as the absolute values of its limits, can be adjusted. If there is comparatively little lag in the controlled process and in the measuring system, effective control may be gained within a narrow throttling range. As increased lag is encountered, the throttling range must be widened to maintain stability. Otherwise the automatic control will cause continuous and objectionable cycling of temperature above and below the desired control level.

It is characteristic of this system, when used without reset, that there is no absolute value of controlled temperature which can be maintained under different loads. Increased supply valve opening to compensate increased load can be gained only through a lowering of the temperature at which equilibrium between demand and supply is reached. When lag is small, and a narrow throttling range can be employed, this variation in the value of temperature or other controlled condition may not be objectionable. When the lag value is large, however, and a wide throttling range must be used, a given change in demand may cause corrective stabilization at a temperature above or below the limits demanded by process requirements.

It is then necessary to reset the control instrument adjustment, to bring the control within the required limits. In some cases reset is effected by manual means. Especially when a lagging process is subject to frequent large changes in demand, automatic reset is commonly employed.

Automatic reset, as now commonly used, in effect causes a raising or lowering of the throttling range, in desired direction, at a rate proportional to the amount by which process temperature is momentarily above or below desired absolute value. The greater the departure of temperature, the greater is the speed at which reset action takes place.

I have outlined the present art, as commonly employed, in order to point out certain inherent deficiencies which it is the purpose of my invention to overcome.

Under common throttling control the setting of the corrective supply valve depends solely upon the momentary measured value of the controlled temperature, and is the same, at any given temperature, irrespective of whether the temperature is rising or falling. Crudely stated, the control instrument in effect knows where it is, at any given moment, but does not know in which direction it is going. It causes no compensating action based on the direction and rate at which change is taking place.

Skilled process operators know that direction and rate of change are important; that there should be extra corrective application during departure, and decreased or even opposite corrective action when control value is again approached, in order to expedite corrective stabilization while avoiding cycling. It is quite common practice, therefore, to disconnect throttling controllers and regulate by hand when major changes in process conditions require correction, and to re-connect the control instrument only when stabilization at desired value has been approximately gained.

It is a purpose of my invention to provide means whereby the direction and rate of change in a controlled condition are automatically recognized and measured by the control instrument, and whereby functions of direction and rate are applied in the control action in such manner as to gain greatly expedited and stabilized regulation, with minimized departure from control level while correction is being effected. These results were in part gained by the means disclosed and claimed in Patent No. 2,140,933. By the means of the present invention it is possible to gain measurement of the rate of change more quickly and accurately than heretofore, and to apply the rate function more effectively in control.

The theory and method may be briefly outlined as follows:

Although the temperature or other value indicated by the measuring element may lag behind the changes in true process value, any automatic control action must necessarily be based on such indicated values. To facilitate discussion, references hereafter to "temperature" etc. will ordinarily signify the momentary values indicated by the measuring unit.

From such values, by the means to be described, I gain a substantially instantaneous and accurate measure of the direction and rate at which the value is changing. Through members in part responsive to value as such, and in part responsive to rate of change, I gain a new mixed value in which functions of departure and rate are combined in any desired relative proportions. Application of corrective agent to the process is controlled by this mixed function, through means which enable adjustment of the amount of valve movement or other control action caused by a given change in such mixed function.

Because the direction of change is opposite to that of the lag of the measuring element behind the true process condition, and because the measuring lag is approximately proportional to the rate of change, this mixed function, if suitably adjusted will give approximate indication of the true momentary value of temperature or other process condition. It may be further adjusted to foresee, in effect, the influence of process lag and to forecast what the process condition will be after some predetermined time interval, if corrective application remains unchanged.

When a throttling control is regulated by this mixed function, rather than by a function of departure only, the first effect of any deviation from control level caused by change in demand is a relatively large corrective application caused chiefly by the rate function, before there has been time for appreciable departure to take place. Because the rate function is quickly established and then remains more or less constant, for a time, it tends to move the control valve quickly to some new position and then hold the valve at that position until altered by gradually increasing departure or further change in rate. Because the rate of change is approximately proportional to the change in process demand, the amount of the initial corrective valve movement as above outlined is also approximately proportional to the change in demand.

As compared with conventional throttling, in which appreciable departure must take place before there is appreciable corrective action, and in which corrective action increases proportionately to increasing departure, the mixed function may be adjusted to quickly effect and more or less hold the amount of valve movement necessary to compensate the change in demand. Because the effect of departure alone is relatively minimized, and because its effect is further increased or decreased by the rate function, depending upon direction and rate of change with respect to the equilibrium control level, greatly expedited correction can be gained without causing overcorrection and cycling.

The net result is to enable stable throttling control within a much narrower throttling range than can be used when control is by departure only.

When automatic reset is required, this is also governed by the mixed function of departure and rate. The result in this case is to increase the rate of reset movement when departure from control value is taking place, over that which would be caused by departure alone, and to retard or even reverse the reset as control level is approached during return. The effect, again, is to expedite correction, with minimized departure and little or no cycling.

Figures 1, 9, 10:
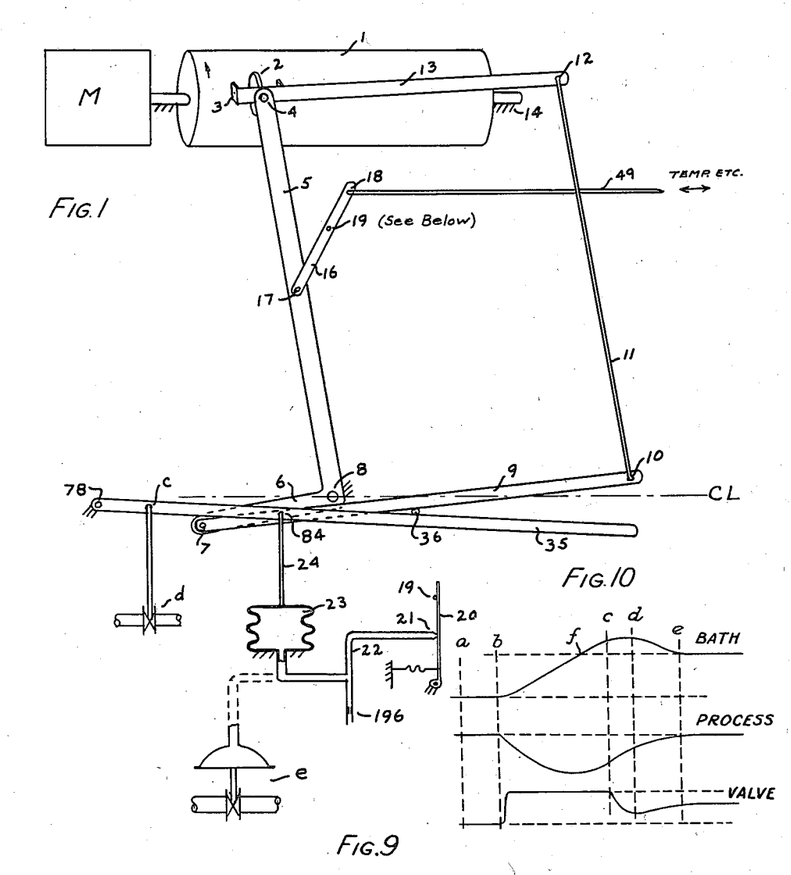
Fig. 1 diagrammatically illustrates a control system and mechanism in which control action is responsive to both the amount and the rate of change.
Fig. 9 diagrammatically compares improved control gained by the methods of the invention, under varying process conditions, with that gained by former methods.
Fig. 10 diagrams simultaneous conditions in improved control of a lagging process.

Fig. 1 illustrates a simple basic form of the apparatus of my invention.

A drum 1, held at fixed position in bearings 14, is driven at constant speed by clock mechanism or synchronous motor M. Bearing on this drum is a small wheel 2, the axle of which turns in fork 3 on the arm 13, which is pivoted at point 4 in the supporting arm 5. The latter is held on a fixed pivot at point 8, and has a 90° extension 6 which turns about the pivot 8 with the same circular deflection as 5. An arm 9 is pivoted on 6 at 7 and is connected by link 11 from point 10 to point 12 on the arm 13. The length of 11 between 10 and 12 is the same as that of 5 between 4 and 8, and the distance from 8 to 10 approximately equals that from 4 to 12.

When the point 10 lies on the center line, CL, the arm 13 is parallel to the axis of the drum, the wheel is normal to the axis of the drum, and regardless of its position there is no lateral motion of the wheel along the drum. When 10 is raised above CL, the revolution of the drum causes the wheel to move along the drum toward the right, and when 10 is lowered below CL the wheel moves toward the left. The rate of travel of the wheel lateral to the direction of motion of the drum surface is approximately proportional to the angle of the wheel with respect to the drum axis, and therefore proportional to the distance of point 10 above or below CL.

In illustration of one useful application of this basic mechanism, assume that one end of an arm 16 is pivoted at point 17 on the arm 5, and that the other end 18 is suitably connected to the Bourdon coil of a thermometer system, so that point 18 is moved to the right or to the left as changes take place in the temperature of the controlled process. At point 19 on the arm 16 a pin engages the flapper of an ordinary flapper and nozzle system for varying release of air, which flows into the bellows and nozzle system under controlled pressure through orifice 196. For simplicity of illustration, pin 19 has been duplicated and the flapper and nozzle system shown in the lower part of the figure.

When the flapper is close to the nozzle, the pressure in bellows 23 is increased and, through link 24, the arm 35 is turned upward about fixed pivot point 78. Through adjustable pin 36 the arm 35 engages the arm 9, and, at the point of contact, moves the latter up or down in approximate proportion to the air pressure in bellows 23.

If a rise in temperature moves the point 18 gradually toward the left, for example, this causes the flapper to approach the nozzle, and by increasingly impeding the release of air, increases the pressure at 23. Through the system just described, the immediate effect is to revolve arm 9 upwardly about the point 7. This raises 10, 12, etc., with respect to the center line, and changes the angle of the wheel with respect to the revolving drum so that the wheel moves toward the right, and in so doing, revolves the arm 5 toward the right. Through connection 17 to arm 16 this largely cancels the movement of point 19 and the flapper, which has resulted from movement of the point 18 in response to temperature change.

The result is a cancelling follow-up system so that any movement of 18 in either direction, caused by temperature change, in turn causes reaction through the system to maintain point 19 at a position which is constant, except for the very small fraction of an inch deflection necessary to gain and maintain proper balancing of the release of air from the nozzle, and resultant correction of pressure in bellows 23.

From the foregoing it follows that arm 5 moves to the right or left, and point 7 moves up or down, about pivot 8, in approximately uniform relation to changes in temperature as measured by movement of point 18. It follows that so long as the temperature is changing, and point 18 is moving, the point 10 must be above or below center line by an amount which is a definite and approximately proportional function of the rate at which change of temperature is taking place. The faster the rate of change, the greater must be the deflection of point 10, in order to increase the angle of the wheel and the rate at which it moves laterally with respect to the uniform motion of the drum surface.

Whenever no change is taking place, regardless of whether the temperature is above or below control level, point 10 must come back to center line in order to stop the lateral motion of the wheel with respect to the drum, and hold arm 5, etc., in some fixed position.

Point 10, therefore, is responsive only to direction and rate of change and not responsive to departure as such. Point 7, on the other hand, rotates about point 8 in the same manner as arm 5, etc., and at any given moment the position of point 7 with respect to its median, or center line position, is a measure of the temperature, and a measure of the departure of the temperature from the control value.

It now becomes apparent that we have a member 9, one end of which is responsive to departure and the other end of which is responsive to rate. From 7 to 10, along this member, the motion of successive points will be increasingly influenced by the direction and rate of change, and decreasingly influenced by direction and amount of departure.

For any given momentary values of departure and rate of change, there is some definite position of member 9 necessary to maintain the correct position and rate of follow-up movement of the wheel, arm 5, point 17, etc. That is, the necessary momentary position of 9 is fixed, except for the minute differences necessary to slightly increase or decrease the distance of the flapper from the nozzle, and gain correct pressure in bellows 23. The latter will automatically vary as necessary to move the arm 35 and, through pin 36, move 9 into correct position. The air pressure and the amount of movement of arm 35 necessary to gain correct positioning of 9 and its associated mechanism will, however, vary with the location of pin 36.

In the position illustrated for members 9, 5, etc., assume that the temperature is below control level but rising toward control level; that is, point 7 is below center line and point 10 is above. In the position shown, point 36 is about halfway between 7 and 10 and equally affected by departure and rate deflections of the points 7 and 10. If the rate remains constant, and the departure gradually decreases, pin 36 will soon be caused to reach and pass the center line and arm 35 will move above its median position; that is, the position where it is parallel to 9 while points 7 and 10 are on center line.

If the rate of temperature rise increases, the system will react through the bellows 23, arm 35 and pin 36 to raise 9 about 7 until 10 is far enough above center line to cause more rapid lateral motion of the wheel along the drum and resultingly cause the system to correctly follow the higher rate of change. This, in turn, raises point 36 to or above center line before any appreciable further movement has taken place at point 7. Either decreasing departure, or increasing rate, or both, may cause 35 to reach and pass median position.

Similarly, if we assume that member 9 is in the momentary correct position as illustrated, but that adjustable pin 36 is moved to the right, so that it engages between 35 and 9 at some point nearer 10, then, in order to maintain correct balance of the system, the air pressure in 23 will automatically be increased, and move 35 to and above center line position, in the original correct momentary position.

We have already said that successive points along 9 from 7 to 10 are increasingly affected by the rate of change and decreasingly affected by departure. It now further follows that, as the pin 36 is adjusted to one or another position from near 7 toward 10, the movement of arm 35 above or below its median position, necessary to gain correct positioning of 9 will also be increasingly affected by the rate of change and decreasingly affected by departure. If supply valve control mechanism of any desired and suitable type is connected to be operated by the movement of arm 35, as diagrammatically indicated from point c to valve d, it follows that valve movement will be a function of both departure and rate, with the relative effects of the two values determined by the position of pin 36. For convenience of discussion the mixed function of departure and rate will hereafter be termed the "ff" value. The amount and/or rate of response at valve d, for a given ff value, may be further varied by varying position of point c in relation to b, or by employing suitable differential linkage between c and d. During departure from control level in either direction, the points 7 and 10 will both be on the same side of the center line or control level position, the deflection of the arm 35 will be in the same direction, and will be a function of the sum of the deflections of the points representing departure and rate of change. When departure movement ceases, and during the brief interval before return starts, the rate of change will be zero, 10 will be on the center line, and the position of 35 will be a function of departure only, or theoretically, finite departure ± zero rate.

During return toward control level, 7 is on one side of the center line, 10 on the other, and the position of pin 36 and arm 35 with respect to CL, i. e., the ff value, will be determined by the difference between the departure and rate values, and may be either positive or negative, depending both upon the relative values of departure and rate, and upon the position to which pin 36 has been adjusted between 7 and 10.

If we consider the position of pin 36, at the point of engagement with 9, to result from a combination of departure component, "f(d)" and rate component, "f(r)" and further express as "ff" the distance of this pin above or below CL, and the resulting deflection of arm 35 and connected valve mechanism, then, at any moment $$ff = f(d) \pm f(r)$$

"ff" may have zero value at any time during approach to control level, when $f(d)$ and $f(r)$ are of equal and opposite value, but can become stable at zero only when both $f(d)$ and $f(r)$ have become zero at control level.

The exact nature of the corrective action which takes place will vary with position of pin 36, and with the type of valve control mechanism which is used and in turn is controlled by the position of the arm 35.

With any given point of connection between members 35 and 9, the ratio of the departure function to the rate function may be varied by varying the speed of drum 1. This may be gained by changing gears between the drum and the driving motor, by varying the motor speed, or an adjustable speed regulating governor may be employed. Such change in drum speed, without other change, does not alter the value of the departure function indicated at point 7 but does alter the angle to which the wheel must be turned in order to follow a given rate of change and, therefore, alters the amount of movement at point 10 caused by a given rate of change. In general, I have found the method of adjustment by varying the position of pin 36 to be preferable, while employing drum speeds which are constant, and are changed only as the total range of the instrument may require change to meet widely different process conditions.

Figures 2, 3, 4, 5:
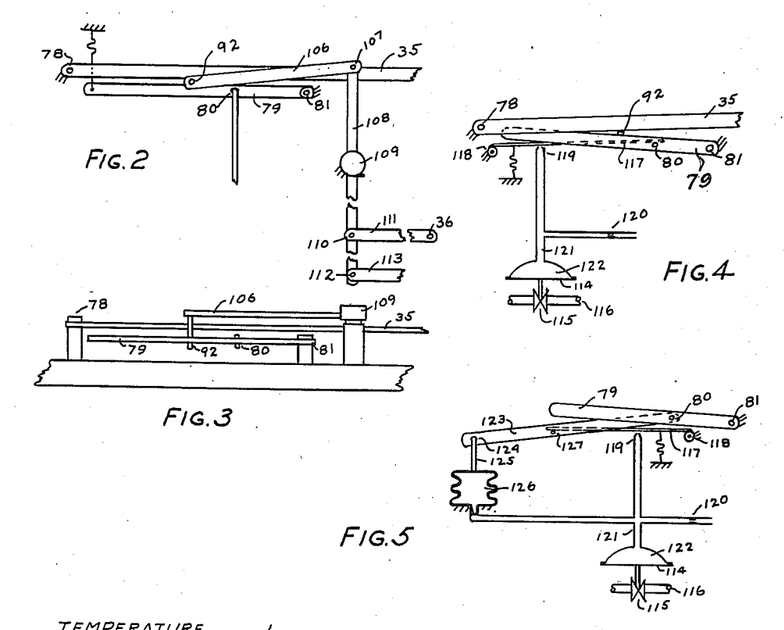
Figs. 2 and 3 show modified connections to apparatus of Fig. 1.
Fig. 4 shows modified connections to apparatus of Fig. 1.
Fig. 5 shows modified connections to apparatus of Fig. 1.
Figure 8:
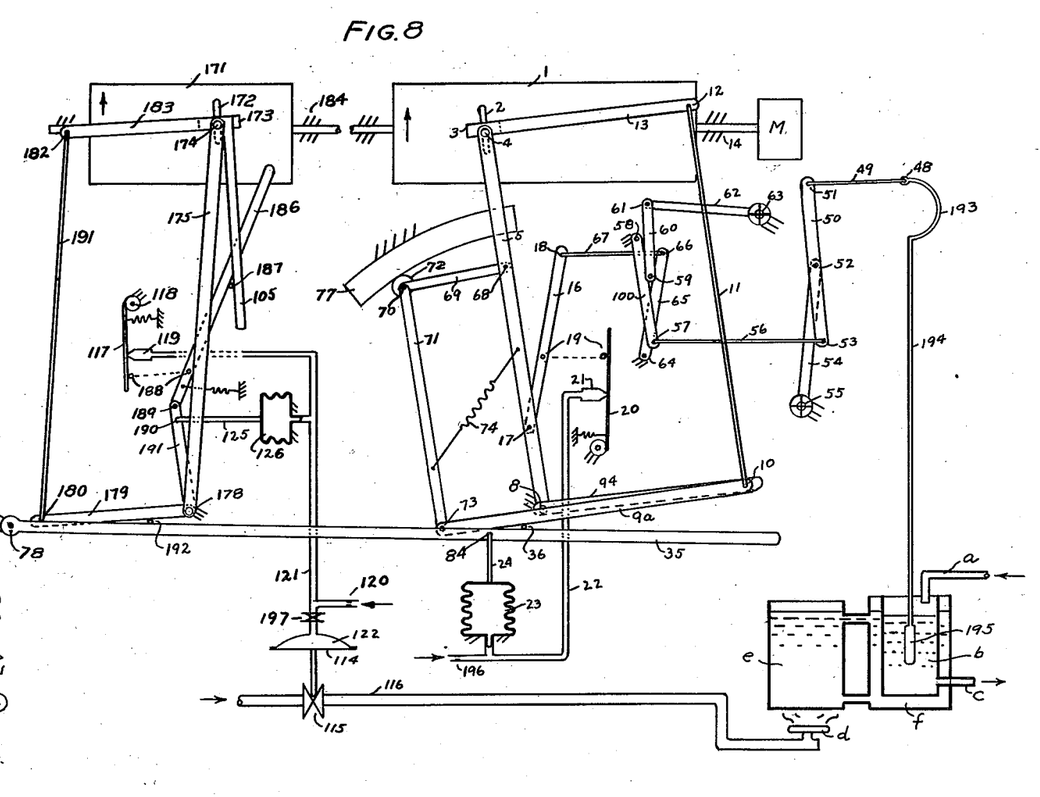
Fig. 8 illustrates in combination the elements of an improved system for pneumatic control.

Different methods and mechanisms for connection between the arm 35, as at point c, and a valve, as d, may be employed. Some of these are illustrated in Figs. 4, 5 and 8. It is also possible, instead of employing separate valve control means, to employ the variations in air pressure actuating bellows 23 to also actuate a supply valve of the well known type in which the valve position is varied in relation to varying air pressure applied to a flexible diaphragm, as indicated by e of Fig. 14. A valve such as e may be directly actuated from the varying pressure in 23, etc., or may be indirectly actuated by such pressure through suitable pilot valve and relay. In either case, however, it is essential, if the full benefit of the control system herein disclosed is to be realized, that the instrument system must be responsive to changes in value of the controlled condition, and to varying rates of change, at many times when the supply valve, such as d or e, is fully opened or fully closed. It follows, therefore, that it must be possible to gain full valve action from changes of controlled condition which represent only a part of the total range to which the instrument is responsive. It further follows, therefore, that if a supply valve as e is directly or indirectly actuated by the same air pressure which actuates bellows 23, this valve should be arranged for full action caused by only an intermediate portion of the pressure range which actuates the instrument control bellows.

Although this method of controlling the corrective supply valve may be made to give excellent results, I ordinarily prefer indirect control of the valve from the position of arm 35, for several reasons. Greater accuracy is possible because, as has been stated, the mechanism of the wheel and drum system is essentially a positioning mechanism, and the pressure in bellows 23, will be varied as necessary to bring the system to correct position. Any resistance of friction or spring tension, etc. will be compensated by increased or decreased pressure in 23, as necessary, to gain correct position. The positions of the members will be accurately determined in relation to process conditions, but, unless all friction and detent are eliminated, the air pressure in 23 may be above or below exact proportional relation to such positions by varying amounts. Also the correct adjustment of valve response, in relation to the amplitude of response of instrument members, may ordinarily be more easily and accurately made through independent connection, than by adjustment of the air pressure range to which this supply valve is responsive.

When the indirect method of valve control is employed, the bellows 23 may be connected to the mechanism at one or another of several points, and substantially equivalent results will be gained. The connecting link 24 may, for example, be connected to any part of member 9, which is not too close to point 7, or, for example, at point 10. With the latter connection, the air pressure variation in the bellows will be responsive to rate of change only, except as affected by friction and other errors which have been mentioned. It will still serve to bring the mechanism into position in the same manner, as with connection at the point illustrated, but in this case, the positioning power will be applied directly to the member 9 and the latter, through pin 36, will move the member 35 to the same successive positions, which it reaches with the connections which have been illustrated, under any given series of process conditions.

Positive, accurate operation of the mechanism as a whole is, however, best assured by connection of the type illustrated. The bellows 23, or any equivalent method of applying power, may be made as large as is desired, and accurately controlled through the positioning mechanism. Any required amount of power may be made available at point c, for example, to accurately control a pilot valve or other mechanism, and any friction, non-uniform spring tension, etc., will be automatically compensated by variation in power applied from 23 through member 35. If 23 was connected to some point on 9, however, equivalent application of power to a pilot valve mechanism would require use of point 7 as a fulcrum, with undue strain on instrument mechanism and possible errors. With the type of connection illustrated, the arm 35 may be made as heavy and strong as desired, while member 9 and all other parts of the positioning instrument may be of relatively light construction, and operate on small pivot bearings for least resistance and highest accuracy. There is negligible strain on these members, other than support of their own weight. The positioning power controlled by such relatively delicate mechanism is strikingly demonstrated by the fact that a finger touch, as at point 10, to momentarily move any part of the instrument system out of position during operation, causes immediate reaction through increased or decreased air pressure in 23, to force the mechanism back to correct position.

Under conditions first discussed in connection with Fig. 1, varying values of the temperature or other condition, are indicated at point 18, and proportionately indicated at point 7, while the direction and rate of change is indicated at point 10.

From an indication of rate, gained in this or other manner, an identical mechanism may be employed if it is desired to measure and/or control changes in the rate of change; i. e., acceleration or de-acceleration. If the point 18, or equivalent point, is moved in response to the rate of change, rather than in response to the value of the condition, the cancelling follow-up action of members 5, etc. will take place in the manner which has been discussed, but the position of member 5, point 7, etc. at any moment will be a measure of the rate of change, while the position of point 10, with respect to CL, will be a measure of the change in the rate of change, or acceleration. Complex functions of primary value, of rate, and of acceleration may be gained, if desired, by means which will become apparent from the foregoing.

For certain special purposes, an acceleration function gained in the foregoing manner may desirably be incorporated in automatic control means. This function bears substantially the same relation to rate of change that the latter bears to the absolute value of a controlled condition. The rate of change function in control, when applied apart from a departure function, tends to resist any change in value of the controlled condition whatever that value may be. The acceleration function similarly tends to resist any change in the rate of change. It may, therefore, be employed to very strongly and immediately cause corrective action tending to resist change from a fixed level, i. e. zero rate of change, but when a rate of change has already been established, the acceleration function tends to resist change in this rate. It is, therefore, not readily applicable in ordinary control operation, but in the general manner which has been discussed for application of the rate of change function may be employed to gain desired control characteristics in special cases.

Either in the form shown, or with modifications, the wheel and drum mechanism of Fig. 1 may be usefully employed for other purposes, of which an example will be discussed in connection with the control of reset of a supply valve. For this and other purposes, it is sometimes desirable to have a system in which one or more members will move in one direction or another at a rate, and in amounts, which are functions of both the amount and time of departure of some value, such as the "ff" value, from a given level, and will remain in whatever position they may be when the actuating value returns to and remains at its predetermined level. Such results may be gained, for example, by connecting point 10 to be responsive to the actuating condition or value. So long as point 10 is above line CL, the wheel and connected arm 5, etc., will be caused to move to the right in relation to the drum, and the amount of such motion will be a function both of the distance from CL to which 10 has been moved, and the length of time that it has been held away from median position. Whenever 10 is returned to median position, the position of the wheel, with respect to the drum, and the position of member 5, etc., will remain constant until 10 is again moved. Means to eliminate a slight error due to circular versus linear motion of various points in the system, will be further disclosed in connection with reset mechanism of Fig. 8.

There are many applications, as for control of reset of a supply valve, where use of the mechanism in this manner to gain a positively determined rate and amount of change in position is useful, and is preferable to the somewhat similar, but less exact effect, which has sometimes been gained through use of liquid or air leakage and check devices.

Fig. 2 and the several following figures, illustrate typical forms and combinations of means which may be employed to suitably actuate valves, or equivalent means, for regulating corrective supply in response to the *"ff"* values indicated by the position of member 35 in Fig. 1, or by the varying air pressure in bellows 23 and the connected system. Similar forms and combinations for control of a supply valve may also be actuated by modifications and equivalents of the apparatus of Fig. 1, certain forms of which will be further described.

In all these illustrations, except as may be otherwise noted, it will be understood that member 35 is actuated as a combined and adjustable function of both the direction and amount of change from a predetermined condition, and the direction and rate of change.

Means for varying the components of rate and departure, which appear in the *"ff"* value, by varying the position of connecting pin 36 in relation to members 9 and 25, have already been discussed. Although in many cases, the single adjustment of the position of pin 36 is sufficient to adapt the characteristics of the control mechanism to process control requirements, it is often desirable to adjust the amplitude of the *"ff"* values; i. e. to multiply their values by some constant, without altering the relative rate and departure components. Figs. 2 and 3 illustrate means by which this may be accomplished. Fig. 18 is a top view, Fig. 3 a side view in part. The member 35 is moved about the fixed pivot 78. Member 79, which turns about fixed pivot 81 is caused to move in response to deflection of member 35 by contact through pin 92. This pin may be held in an adjustable mount attached to either member, or may be mounted as shown on an arm 106 pivoted at 107 on another arm 108, which is supported at point 109. A screw clamp may be provided at the latter point in order to hold 108 in one or another desired position, which will, in turn, cause pin 92 to function in one or another desired position with respect to the pivot points 78 and 81. The pivot 107 allows 92 to freely follow deflection of 35 and cause responsive deflection of 79, but the amount of such deflection of member 79, in relation to that of 35, will be progressively increased, as the position of arm 108 is adjusted to move pin 92 progressively to the right, and vice versa.

Connection to varying types of valve control mechanism may be made from member 79, as from point 80, through a connecting link 82, or in other suitable manner, and the amount and/or rate of valve response, resulting from a given *"ff"* value, will vary as the position of pin 92 is varied.

It has previously been stated that, with the form of linkage illustrated in Fig. 1, the departure function appearing in the *"ff"* value decreases, as pin 36 is adjusted towards point 10. It is sometimes desirable to further vary amplitude of the *"ff"* movement, in the manner which has been discussed, simultaneously with variations in the position of pin 36. One means of gaining this result is further illustrated in Fig. 2. Member 111 is pivoted at some point as 110 on an extension of 108. Pin 36, of Fig. 1, is suitably mounted in member 111 so that as 108 is clamped in one or another position in relation to fixed point 109, the positions of both pin 36 and pin 92 will be adjusted in some predetermined relation. This relation may be modified as desired by suitable modification of the connecting linkage. The same principle may be readily extended so that either or both of the adjustments here discussed may be separately or jointly varied in predetermined relation to adjustment of other values.

Similarly, either or both of these adjustments may be automatically varied in response to changes in value of some condition which is interdependent with the primary condition which is being controlled. If, for example, the instrument system is connected for control of temperature of a liquid, in a process vessel in which the liquid level varies widely, and causes resulting wide variation in the amount of lag and in the rate of response of the process to a given change in heat supply, the connecting pin 36 and/or 92 may be so connected that their positions will be suitably varied in response to changes in the liquid level. Suitable means for indicating liquid level may be connected as, for example, at point 112 through link 113 to cause suitable automatic adjustment. During such use member 108 should, of course, be allowed to pivot freely about point 109 except as controlled in the manner described.

Details as to the nature and amount of adjustment which may be desirable, at different points in the mechanism, will vary with the design, proportions and adjustment of related measuring and control means, as well as with the nature of the controlled process and many other factors. Specific quantitative relations which are desirable, cannot be detailed except with respect to all other factors, but a major improvement of the mechanism herein disclosed, over those which have been commonly employed, lies in the facts that all ordinarily desirable adjustments may be positively effected by simple mechanical means, may be easily inter-connected as desired, and such adjustments have continuously progressive effects on the control operation, which enable exact calibration and predetermination of results. The nearest approach to equivalent means, heretofore used, employ various forms of liquid or gas pressure and check devices, in which movement or response to a given impulse is modified by adjustable leakage valves, or by restricted flow through capillary tubes. The latter do not lend themselves well to uniform, progressive adjustment or exact calibration. The variable leakage valves do not have desirable or easily calibrated characteristics.

Fig. 4 illustrates in a semi-diagrammatic and simple form, a means of pneumatic throttling which may be controlled in proportion to the *"ff"* value indicated by the control instrument, in the manner which has been described. The pin 80 on member 79 engages a flapper 117 pivoted at 118. As 117 is moved towards or away from nozzle 119, it varies the release of air introduced under controlled pressure through orifice 120, and, in turn, varies the pressure of air in chamber 122, and the resulting deflection of the diaphragm 114, which controls the opening of the valve 115 in the line 116 through which fuel, steam or other corrective supply is supplied to the process. With this arrangement, the valve position is varied as a direct function of the "ff" value. The sensitivity of the valve movement to a given "ff" value, and the related amount of valve movement caused by a given increase or decrease in the value of the primary condition when there is no rate of change, may be varied through adjustment of the position of pin 92. Stated in commonly accepted terms, changing adjustment of pin 92 towards the left widens the throttling range. Other equivalent means of adjustment will be apparent.

A second form of throttling control, which has some advantage of more uniform accuracy over a wide range of adjustment, is diagrammatically indicated in Fig. 5. In this figure, the flapper 117 does not directly engage a pin located at point 80, but engages a pin 127 on the member 123, which is at one end pivoted at point 80, and at the other end at point 124. Through link 125, 124 is moved in response to changes of air pressure in the bellows 126. The latter is connected to the pneumatic valve control system, as shown. As point 80 is moved upwards, by movement of member 79, which is actuated as in Fig. 4, the pin 127 is raised, and in turn raises 117 to cause increased release of air from the nozzle 119. This, in turn, reduces the pressure of air in the connected system and causes partial collapse of the metal bellows 126, which lowers point 124 and causes partial return of 127 and 117 towards their original position.

The supply valve actuating means, which are illustrated in Figs. 4 and 5, illustrate in simple and semi-diagrammatic form the principles of means which are known, and are not a part of my invention, except as to the methods and means by which they are actuated as an adjustable combined function of departure and rate of change of the controlled condition, or as a further and complex function of both the foregoing and an additional function or functions determined by some interdependent condition.

Figure 6:
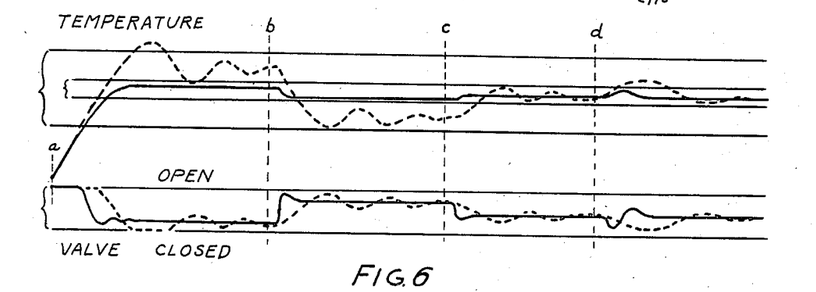
Fig. 6 diagrammatically illustrates the improved control which may be gained by the methods disclosed.

Typical improvement in throttling control which may be gained by the methods of my invention, using means such as those above described, is illustrated in Fig. 6, showing process control when time and capacity lag are present. The upper curves represent temperature on a vertical axis and time on a horizontal axis. The lower curves indicate corresponding position of the corrective supply valve. In each case the solid line represents results gained when throttling is regulated by a suitably adjusted "ff" value, while the broken line represents results when throttling is controlled by departure alone, in the ordinary manner, with the valve adjusted to operate in the approximate narrowest throttling range which will avoid continuous cycling, under this method of control. At point a, process heating is started from a temperature well below the throttling ranges, under relatively light load. At point b, the load and the heat requirements are sharply increased, but, as indicated by the temperature curves, there is some time lag before indication of resultant falling temperature is gained at the lagging instrument. At point c, the load is reduced; while at point d the load is temporarily further decreased, and then returned to previous value. The temperature curve represents the instrument response by which control action is initiated in both cases. It will be noted, in striking contrast to the ordinary throttling by departure, that throttling control by a suitably adjusted "ff" value brings the process condition quickly to stability, within a relatively much narrower throttling range, with little or no overrun and cycling. Continuing or temporary changes in load are quickly and accurately compensated within this much narrower throttling range. The amount of departure from previous control level and the time required for full correction are both greatly reduced, while cycling is substantially eliminated. As a result, the average condition of the controlled process is held much closer to desired level, and, because of the reduced departure resulting from change in load, the need for reset to exact level is minimized. Manual reset may be sufficient in many cases where automatic reset is now required.

Under the conditions illustrated in this figure the supply valve, at the start of lagging indication by the instrument, quickly moves to and slightly beyond the position of ultimate stability with the changed load, and quickly compensates any excess or deficiency of demand over supply. Because of this quick action, the resulting peak of excess demand on the corrective supply need be no greater, and may be of much shorter duration than the equivalent excess demand under the other method of control. In applications where it may be desirable to further minimize excess peak demand on the corrective supply, it is possible, by slightly reducing the rate component in the "ff" function, and by slightly widening the throttling range, to gain corrective action in which the valve substantially moves to and holds required position for compensating the changed load with little or no excess peak demand.

Details of form of curves, and relative width of throttling ranges, etc. will vary with process and other conditions, but those here illustrated are based on curves gained in actual control operation, and are typical. Reductions from 50% to 80% and more in departure, and in time required for correction, under similar process conditions have been gained in comparison with throttling control of the types now commonly employed. If the "error of control" is considered to be measured by the area between the actual control curve and the line of desired control level, or equal to the mean departure multiplied by time, the improvement in control gained by my methods is even more striking.

In many applications, it is desired to maintain the condition of the controlled process as close as possible to a fixed, predetermined control level, without need for manual readjustment of the control index to compensate for changes which result from changes in demand. Automatic reset of the throttling range, by various means, is now commonly employed to gain this result. Marked improvement in the control operation of an instrument of this type may be gained by applying the methods of my invention in such manner that throttling and reset operations are controlled in response to suitably adjusted "ff" values, instead of being controlled only in response to amount and time of departure of the control value. Such application of my methods enables satisfactory use of a much narrower throttling range, and much faster reset, than could otherwise be used in control of a lagging process, without causing cycling. A suitable method of application is diagrammatically illustrated in Fig. 7.

Figure 7:
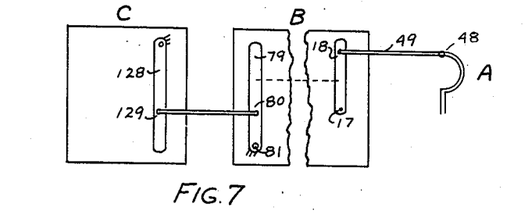
Fig. 7 diagrammatically illustrates connection of the apparatus of the invention to conventional control mechanism.

C represents any ordinary type of throttling and reset controller, the operation of which is controlled by movement of some member 128, which, at point 129 is customarily actuated in direct response to measurements indicated by some suitable element A, as at point 48 of a Bourdon coil. That is, under common conditions of use, there would be direct connection between 48 and 129. B diagrammatically represents a suitable apparatus of my invention as, for example, that illustrated in Fig. 1, and extended in Fig. 2 and other drawings. By connecting point 48 to point 18 of my apparatus, and connecting from point 80 of the latter to point 129 of the mechanism of the ordinary controller, greatly improved results may be gained with the latter, as has been stated.

Although greatly improved control results may be gained in the manner above indicated, I have discovered that even better regulation to a fixed and predetermined control level may be gained by methods and means which are based on theoretical considerations somewhat different from those which underlie ordinary throttling and reset, and that mere application of "ff" control to the latter is not sufficient to gain best possible results. The principle of operation, of the ordinary throttling and reset controller, makes throttling, the major control operation through which departure is checked and supply balanced against a change in demand. Such correction involves a change in the level at which balance is gained, within the throttling range, whenever there is a change in demand. Reset, as customarily employed, is a secondary operating function, which gradually brings the process back to predetermined desired control level by raising or lowering the whole throttling range, until such control value is reached.

Reset, when actuated only in response to departure of the condition from predetermined level, cannot be satisfactorily used except in conjunction with throttling because it unavoidably causes over correction in both directions, with resultant continued cycling. Even with the damping effect exerted by the throttling, there is a considerable tendency toward overrun and cycling before ultimate stability is regained after change in demand. The net result is that appreciable overrun and temporary cycling must be tolerated, in order to gain reasonably prompt return of the process condition to approximate control level, or else the return must be made very slow. Even under the former condition, the rate of reset must be made relatively slow if continuing cycling is to be avoided. Because of this fact, the reset must be, as previously stated, a distinctly secondary operating function.

I have discovered that excellent control of lagging processes may be gained through full floating reset, without use of throttling as ordinarily understood, when the direction and rate of reset is controlled by a suitable "ff" value. I have further discovered, however, that very striking improvement in control regulation and close approach to the best regulation which is theoretically possible, under a given condition of lag, may be gained when valve operation is further modified by a temporary function which causes the valve movement to lead the position which would be reached by reset alone, by an amount which is determined by an "ff" value. Control of this type, in which valve lead and reset are controlled either as related or independent functions of the same or of separately determined "ff" values, will, for convenience in further discussion, be broadly designed as "ff valve lead reset" and be indicated by the abbreviation "ffVLR."

One form of improved mechanism for gaining "ffVLR" control by precise mechanical means, which do not require regulation of differential air pressures, or adjustable constrictions to supplement the operation of the pilot valve in gaining desired operation of the main supply valve, is semi-diagrammatically illustrated in Fig. 8, which further illustrates combination with a modified form of the apparatus of Fig. 1, and with other apparatus, to form a suitable complete combination of elements for the practice of the methods of my invention.

In Fig. 8, the members 1 to 5 inclusive, 8, 10 to 14 inclusive, 16 to 24 inclusive, 35 and 36 correspond to the similarly numbered members which have been described in connection with Fig. 1. Members 114 to 122, inclusive and members 125 and 126 correspond to those which have been described in connection with Fig. 5, but the means by which they are actuated in the apparatus of Fig. 8 is modified from that previously described. A lagging process to be controlled is diagrammatically illustrated in connection with the illustration of the control apparatus.

Fluid entering vessel b, through the pipe a, is to be heated to constant temperature, so far as possible, before discharge through the pipe c. Changing load, and resultant change in demand on the heat supply, results from variation in the amount of flow through b. Heating is indirectly effected from a gas burner d, which heats liquid in e, and the latter is circulated through the jacket f surrounding the vessel b. Flow of gas to the burner d is controlled by varying the opening of valve 115 in the supply line 116 in the manner to be described.

Assume that the process temperature as indicated by the thermometer bulb 195 is below but rising toward desired control level. Through connecting tube 194 and Bourdon coil 193 the rising temperature is causing gradual deflection of 48 towards the right. Through link 49, the arm member 50 is caused to deflect responsively about pivot point 52 on arm 54, which may be held in one position or another with respect to fixed point 55 by means of a lock nut. The control index to which the apparatus responds may be varied by adjusting the position of 54 and 52.

Movement of point 51 to the right causes point 53 to move to the left and, through link 56, move arm member 100 to the left about fixed point 58. The pin 59, in arm 60, which pivots freely about point 61, is interposed between member 100 and member 65, so that spring tension which tends to move 65 towards the left about fixed point 64, holds 65 in a position of contact which is determined by the position of 100, and the position of 59 with respect to both members. The amplitude of response of member 65 to a given deflection of member 100 may be varied by varying the position of 62 under the fixed point lock nut 63. These adjusting mechanisms are similar to those described in connection with the pin 92, in Figs. 2 and 3, for varying the ratio of response between two arm members.

Movement of 100 towards the left reacts through 59, 65, 66 and 67 to cause end 18 of member 16 to move toward the left. Resultant movement of pin 19 tends to cause flapper 20 to close on air nozzle 21, and by reducing escape of air from the latter to increase the pressure in metal bellows 23, resulting from inflow of air under controlled pressure through the orifice 196. For clarity of illustration, the nozzle and flapper system are shown to the right of their true position with respect to pin 19, under member 16.

Increasing pressure in bellows 23 causes expansion and, through link 24 to point 84 on member 35, and through connecting pin 36 to member 9a, causes upward pressure on the latter. The immediate momentary effect is to cause 9a to rotate upwardly about pivot point 73 and, through 10, 11, 12, 13, etc. turn the angle of the wheel 2 to cause arm 5 to move to the right. The resultant motion of 17 toward the right largely cancels the movement of pin 19 which has been caused by movement of point 18 toward the left, the entire reaction being substantially as has been described in connection with Fig. 1, but the mechanism here illustrated is different to the following extent.

Members 6 and 9 of the previous figure have been omitted. Member 94 pivots about fixed point 8, independent of member 5, and is of the same length between 8 and 10 as member 13 between 4 and 12. These members, and members 5 and 11, form a parallelogram. The member 9a, which replaces member 9 of the previous figure, is pivoted at point 10 on member 94 and is similarly pivoted at point 73 on member 71. At point 70 members 71 and 69 are independently pivoted on the shaft of cam roller 72, which engages the fixed cam 77. Member 69 is pivoted on 5 at 68, the spring 74 aiding to keep the several members in uniform contact. Except as to this modification, the operation of this part of the apparatus is equivalent to that which has been discussed in connection with Fig. 1, to cause member 35 to deflect above or below median position as a combined function of the separate functions of departure and rate of change.

In the above described mechanism a clock or motor M revolves the drum 1 at constant speed, which for typical process requirements, may suitably be on the order of one revolution per minute. Control over a wide range of process conditions may be gained through adjustment at other points, without varying the speed of revolution of the drum. In theory, the apparatus will correctly follow and control process changes taking place at rates varying from zero up to the highest rate which the wheel 2, and associated mechanism, can correctly follow when the steering arm 13 is deflected by the maximum amount permitted by limit stops, which are not shown in this illustration. In practice, however, it is desirable to employ a drum speed such that the control instrument is capable of responding to rates of change somewhat higher than the maximum which may be encountered in the process being controlled, while at the same time low enough so that measurable deflection of members 13, 9a, etc., will be required in following normal process changes. The practical range of adjustment for a given drum speed is possibly on the order of 10 to 1; that is, if the drum speed is sufficient to enable effective control in one process, in which the maximum rate of change to be encountered is comparatively high, the instrument may be used, without changing the drum speed and merely by changing other adjustments, for control of the process in which the maximum rate of change to be encountered is only one-tenth as great as in the previous case. There is, of course, no fixed relation, and these figures are used only for approximate indication of the practical ratio. For control of either very slowly or very rapidly changing processes, the speed of the drum may desirably be altered by use of suitable gears between 1 and M.

Further response of the apparatus to a rising temperature indicated at 195, is as follows:

The instrument response already described is causing "ff" member 35 to gradually rise, about fixed pivot 78, towards median position. In so doing, through adjustable connecting pin 192, it deflects arm 179 upwardly about the fixed pivot 178. Separately pivoted about the latter point is member 175 at the end of which, at point 174, the arm 183 is pivoted and, in turn, supports wheel 172 in the fork 173. The wheel bears against drum 171, which revolves in the same direction as 1 and, if other parts are suitably proportional, may be mounted on the same shaft with 1 to revolve at the same speed, or may be made an extension of drum 1.

The members 179, 183, 175 and 181 form a parallelogram, as described for the other part of the apparatus. When member 35 is in median position, and the "ff" value is zero, the connecting pin 192 holds 179 parallel to 35 and, through 181 and 183, etc., holds wheel 172 normal to the axis of drum 171, so that it merely rotates in contact with the drum, but does not move laterally in either direction with respect to the drum surface. Deflection of 35 in either direction from median position, however, causes lateral movement of the wheel along the drum in the manner which will be understood from previous description of other portions of the apparatus, with resulting deflection of the supporting member 175 about 178.

The arm 105 is rigidly attached to 183 and at right angles to the latter. Through the adjustable pin 187, deflection of 105 controls deflection of arm 186, the latter being pivoted at point 189, on the arm 191, which is independently pivoted about point 178. The pin 188 in arm 186 engages the flapper 117, which controls release of air from the nozzle 119, in the manner which has been previously described. Deflection of 186 to the right, at the point of contact through 187 with 105, causes the flapper to close against the nozzle 119 and increase the air pressure in the system with resultant expansion of bellows 126. This, through 125 and 190, results in cancelling follow-up to the left at point 189 in the manner which has been described. Air, at controlled pressure, is introduced into the system through orifice 120, and the pressure within the system, varied in the manner just described, either directly or indirectly causes variation in the position of valve 115. Under the process conditions here used for illustration, the valve 115 is caused to progressively open as the pressure in the system is increased.

At all times when the "ff" value is zero, and 183 is in position to hold the wheel 172 normal to the drum, the arm 105 is also normal to the axis of the drum. If 172 is moved from one position on the drum, at which the "ff" value is zero, to another position at which the "ff" value is again zero, and lateral movement has ceased, the net lateral movement of all points on 105 will be the same as that of 172. But, during deflection of 179, 183, etc. to cause such lateral movement of the wheel and connected mechanism, points on 105 will be deflected in a direction to cause them to lead the lateral movement of 172, and 174 in an amount which increases with the distance of such points from the point of attachment to 183. At any given point on 105 the amount of such leading movement is a proportional function of the "ff" value.

It follows, therefore, that the movement of 105, and the resulting deflection of 186 at 187, when the "ff" value is above or below zero, is a composite movement. Positive or negative "ff" value causes lateral movement of 174, etc. at a rate which is a proportional function of the "ff" value. The position of point 187 at any moment is determined by the position of point 174 plus an amount which is proportional to the momentary amount of the "ff" value. But the direction and rate of movement at 187 is determined by the rate of movement of 174, plus or minus the rate at which 187 may be rotated about 174 in response to rate of change in the "ff" value. The net movement of 187, and resulting change in position of the supply valve, may be either in the same or an opposite direction to that of 174, depending on conditions.

To the extent that the rate of change of the controlled process condition appears in the "ff" value, it may be said that the rate of change in reset position, at 174, is a function of such rate, while the relative rate of change in position of 187, and the supply valve, is a similar function, plus or minus a function of the rate of change in the rate of change of the process, i. e. acceleration.

Under the momentary process conditions which have been assumed for illustration, in connection with Fig. 8, the reset movement at 174 is continuing, in a direction tending to further increase the supply, but the "ff" value is decreasing at a sufficient rate to have more than offset this at 187 and started partial closing of the valve.

With further rise of process temperature, the "ff" value will decrease to zero and gain finite value of opposite sign before control level is reached, all as previously described. This further closes the valve but with near approach to control level, and decreasing rate of change, the opening or closing of the main supply valve 115 will be modified as necessary to bring the process temperature smoothly to control level, after which the "ff" value remains substantially zero, and the wheel 172 and the connected mechanism remain in whatever position they may then be, to maintain constant air pressure in 126 and 122 and hold valve 115 in a position where the fuel supply is adjusted to exactly compensate the process demand.

In connection with the parallelogram form of linkage for control of wheel angle as illustrated, for example, by members 175, 179, 181 and 183 in Fig. 8, and in connection with the application of such mechanism to control of reset of the position of a valve in a combination such as that further illustrated in Fig. 8, I have discovered certain characteristics which are of practical importance.

Member 179 may be omitted and the linked point 180 be independently located on some other member, if desired, but in either case, the distance between 180 and 178 should be identical with that between 182 and 174 if the wheel 172 is to be normal to the drum, and have no motion lateral to the movement of the drum surface, at all times when 180 is in median position. If length 180—178 is less than the length 182—174, then, for any specific position of 180, there is some corresponding position of 172 with respect to the drum, toward which the wheel will gradually move until equilibrium is attained. If the link 180—178 is greater than that of the other member, then, if 180 is above or below a certain position, the wheel tends to continue travel in one direction or the other toward an end of the drum, and an unstable condition results. With members 179 short, for example, the equivalent of a throttling range is introduced into the reset action so that, except at one point, some deflection of member 179 is necessary to hold the wheel 172 and the valve 115 in fixed position.

A narrow uncorrected throttling range of this type is characteristic of throttling and reset controllers of the type now commonly employed, in which reset action is gained by slow leakage of air or liquid to or from a metal bellows or equivalent device. A measurable even though small rise or fall in the value of the controlled condition is necessary, in such devices, to maintain the varying air pressures required to hold the reset mechanism stable in the position corresponding to varying demands. With a mechanism such as that illustrated in Fig. 8, the foregoing is true if member 179 is slightly shorter than member 183. If, of the same length, however, and if the members 175 and 181 are equal to each other, exact reset to a single control level may be gained.

Fig. 9 indicates process correction gained under "ffVLR" control in comparison with control by ordinary throttling and reset, in a process having time and capacity lag, under conditions similar to those described in connection with Fig. 6 for throttling alone. Fig. 9 is in similar form to the previous figure, and the lettered points indicate similar process changes.

A process of the type diagrammatically illustrated in Fig. 8 introduces a third type of lag, which alters the desired form of control curves. This results from the fact that an appreciable temperature differential, between bath fluid $e$ and process fluid $b$, is necessary to gain required heat transfer, and the amount of differential varies with the process load. Due to relatively large capacity of $e$, some little time is required after a change in load for the bath to heat or cool to the new differential value, even though the fuel supply may in the meantime be turned fully on, or fully off, to expedite the change as much as possible. A process having this type of lag is very difficult to control by ordinary throttling and reset methods. By the methods of my invention, through suitable adjustments of apparatus as illustrated in Fig. 8, I am able to gain greatly improved control over such a process, with corrective action closely approaching the best which is theoretically possible.

The control action which may be so gained is approximately diagrammed in Fig. 10. In this figure the upper line represents differential temperature of the heating bath, the middle line the process temperature and the lower line the valve position during correction for an increase in load; all three being plotted against time. Between $a$ and $b$, the process is at control level with the bath temperature and valve position in correct relation to the demand. At $b$, the process temperature starts to fall because of an increase in load. The supply valve is almost immediately moved to or near wide open position to raise the temperature of the heating bath at the highest rate possible, as indicated by the slope $b$—$f$. The drop in process temperature unavoidably continues, however, until the bath has reached the approximate temperature indicated by $f$, which is the temperature level for final stabilization against the increased demand. If the bath temperature was held at this value, however, considerable time would be required for the process, which has now fallen considerably below control level, to return to desired value. The fuel supply is, therefore, left on to further heat the bath and start rapid return of the process condition. At a point c, the valve starts to close and at d has overrun in the opposite direction, to avoid overcorrection, while the excess of heat in the bath, and the deficiency of heat in the process, are cancelling and each tending to bring the other toward the level of final stability. From d to e the valve moves as necessary, to bring all values smoothly to equilibrium at e. Total correction approaches the quickest which is theoretically possible, under a given condition of lag.

For illustration, I have discussed control of temperature but the same considerations apply in control of other conditions.

Various methods of linkage to the basic elements of the system may be employed to actuate a member corresponding to member 186, and to further vary the air pressure in the valve system in the manner which has been described. The form of linkage shown in Fig. 8 is for typical illustration and has the advantage for common applications that the rate of reset action, and the amount of valve lead which results from a given "ff" value, may be simultaneously and proportionally adjusted by changing the location of pin 192. The latter, and other adjustable connecting pins, may be mounted as illustrated and described in connection with Figs. 2 and 3 for independent or dependent adjustments.

Further operation of the combination above described, under varying process conditions, should be apparent without detailed description. It will be apparent that with the form of apparatus here illustrated, the "ff" value can remain stable at zero, and the air pressure in the supply valve system can be stabilized at some definite value, only when the position at point 73 corresponds to zero departure in control level, and the position of point 10 corresponds to zero rate, with wheel 2 and arm 5, etc. in corresponding median position. Adjustment of pin 59 does not alter this median position, but does simultaneously and proportionately increase or decrease both the amount and rate of movement of the mechanism, which results from a given temperature change. Adjustment of 59 toward 64, for example, increases proportionately the amount of the "ff" response, at whatever point 36 may be located, to increase the amplitude of movement of member 35, etc. resulting from a given condition of the controlled process. But, zero "ff" value will be gained under the same conditions as before, and variation of the position of 59 is, in effect, equivalent to multiplying the "ff" value by an adjustable constant.

Adjusting the position of pin 192 has a substantially equivalent effect, the result in either case being to increase or decrease the rate of reset and amount of valve lead, which results from a given process change, through a given combination of departure and rate functions determined by the position of pin 36. Adjustment at only one of the points 59 or 192 is ordinarily necessary, to gain the desired sensitivity of valve response.

In connection with control apparatus such as the foregoing, and other forms described, the sensitivity of the valve, or other means for varying corrective application, to the indication of rate of change may cause undesirable over-correction or under-correction for a brief period following re-adjustment of the control index of the instrument to a new control level. This results from the fact that such change in control index actuates the instrument mechanism in a manner equivalent to a temporary infinite rate of change in the controlled condition. During the brief period in which the instrument is re-adjusting itself to the new index, the positive or negative rate of change indication may be the maximum permitted by the limit stops of the mechanism. This may cause large change in correction at times when only relatively small change in correction may be actually desired. Such overcorrection may be avoided in a number of different ways.

In Fig. 8, for example, a valve 197 may be inserted in the air line leading to the pressure chamber, 122, of the valve controlling corrective supply. Before the control index of the instrument is changed, valve 197 may be closed and will serve to hold the pressure in 122, and the position of valve 115, approximately constant while the instrument mechanism is readjusting to new index value. A few seconds will ordinarily suffice for this, after which valve 197 may again be opened. Desirably, this valve may be actuated by a member within the instrument case, which must be moved to close the valve before access to the index adjusting mechanism can be gained. To avoid possibility that reopening of 197 may be overlooked, after readjustment of the instrument has been completed, a time mechanism may be added to automatically reopen 197 after a suitable interval of delay.

Equivalent means for temporarily holding the position of electrically operated valves, or valves of other types, during change of control index should be obvious.

Figure 11:
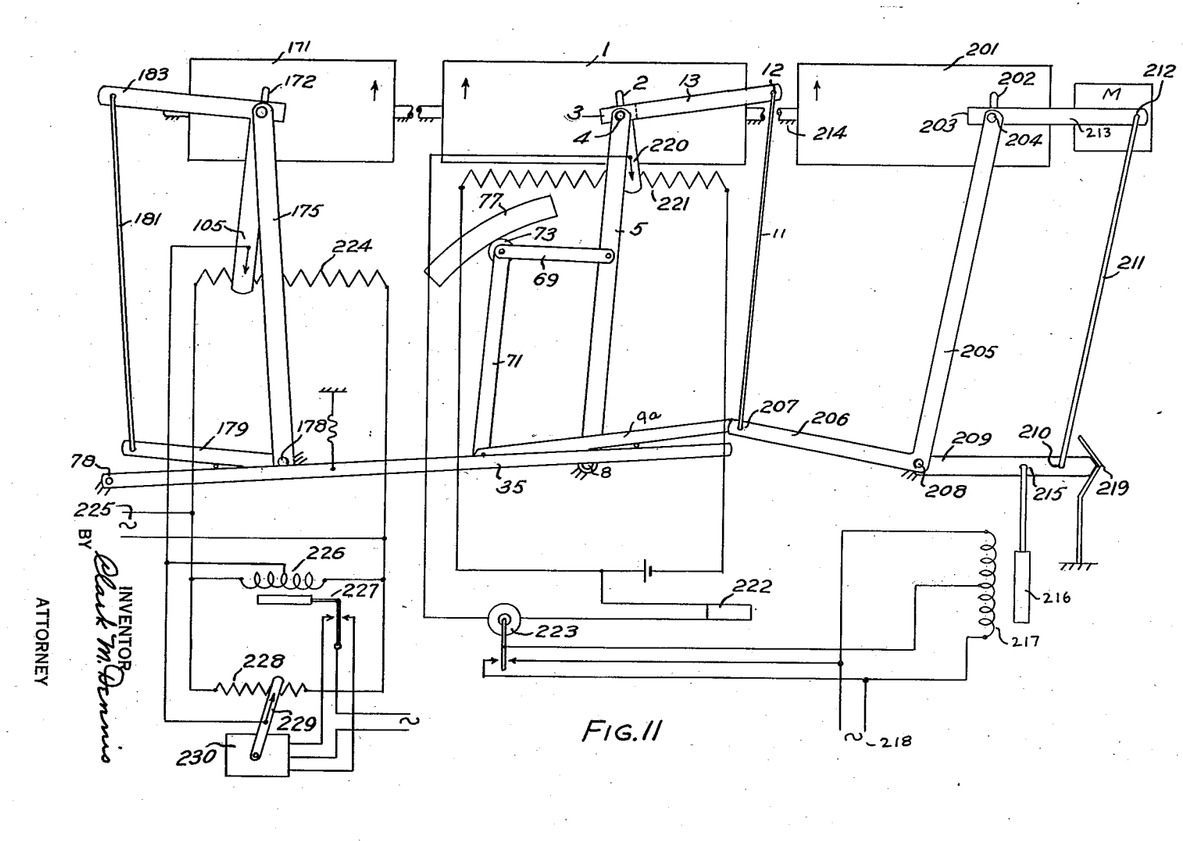
Fig. 11 illustrates in combination the elements of an improved system of electrical control.

Fig. 11 in semi-diagrammatic form illustrates one of many possible combinations by which the methods and apparatus of my invention may be readily adapted to control when measurement and/or variation of corrective supply is to be effective by electrical, rather than pneumatic means. The drum and wheel system, comprising members 201 to 214 inclusive, should be readily understood from the previous description. Link member 11, controlling deflection of arm 13 and angle of wheel 2, is connected at point 207 equivalent to point 10 of the previous figures. A solenoid plunger 216 is linked to arm 209 at point 215 and actuated by current in the solenoid 217 from a source of current 218. When current is flowing in both halves of the solenoid, the plunger 216 is centered and exact centering of member 209 is further aided by any suitable type of centering spring as diagrammatically illustrated by 219. When member 209 is centered, the lateral position of wheel 202 with respect to revolving drum 201, remains substantially constant and the positions of member 205 and point 207 will also remain constant. When plunger 216 is pulled down, the resulting deflection causes wheel 202 to move toward the left, and when 216 is moved up, the opposite movement of the wheel and connected members results.

A contact arm 220 is mounted on member 13 in the same manner that arm 105 is mounted on 183. 220 is in circuit with the balancing resistance 221, a thermocouple 222, which measures the temperature of the controlled condition, and a microrelay 223. When unbalance exists in this measuring system, the relay 223 causes one or the other half of the solenoid 217 to be short circuited with resulting deflection of the system which has been described. Point 207 will be progressively raised or lowered and cause wheel 2 and member 220 to move in a direction to balance the circuit. Balance can be gained and maintained only when the contact between 220 and 221 is momentarily at the correct balance point, and is also moving at a rate corresponding to the rate of change in the measured and controlled condition as indicated by the thermocouple. Except as to a small lead or lag, introduced by the damping effect to be described, the amount of deflection of member 205 and of point 207, etc., from median position is a measure of the rate of change.

Use of a microrelay at point 223 indicates merely the fact of unbalance, without indicating the amount of unbalance. Damping within the instrument is therefore necessary to prevent overrun and cycling of instrument response. This is gained in the illustration by effecting contact in the measuring circuit from member 220 to resistance 221, instead of making such contact directly from member 5 or an equivalent member responsive to change only. The amount of rate lead in the balancing contact may be varied, as necessary to gain desired results, by varying the length of 220 from point 4 to the point of contact with 221.

An ordinary reversible motor may be substituted for the wheel and drum system of members 201 to 214 and the solenoid 217, with motor operation actuated from the relay 223 to move point 207 up or down. The wheel and drum system has been included in the drawing both to illustrate its adaptability to a variety of purposes, and also because it can be driven from the same motor employed to drive drums 1 and 171, with economy as compared with employment of a separate motor. The system has further advantages of fixed rate of response, with no motor overrun when the relay 223 is opened.

The electrical valve control system used for illustration is of well known type and requires explanation only in connection with means of combination with the apparatus of my invention. Member 105 is equivalent to the similarly numbered member in Fig. 8 but, in this case, carries an electrical contact which engages a resistance 224. The latter is in a double potentiometer circuit with a source of current 225, a relay solenoid 226, relay contacts 227 and a second resistance 228, which is engaged by contact 229 actuated by movement of the supply valve motor 230.

In this instance, the position of the supply valve, actuated by motor 230, will be varied in direct relation to the point of contact of 105 with 224. This point of contact is equivalent to connecting point 187 of Fig. 8. Operating characteristics and adjustments will be substantially as previously described.

Obviously, a pneumatic valve system may be used in conjunction with an electrical measuring system or vice versa, and many modifications of circuit and other details are possible. Fig. 11 has been included only to show one suitable combination, in illustration of the fact that the methods and basic mechanisms which have been described may be readily adapted to electrical as well as to pneumatic measurement and control systems.

In addition to the greatly improved control which is enabled by the methods and means which have been disclosed, I have discovered that they also enable the marked practical advantage of increased ease of adjustment of the apparatus to the requirements of the controlled process.

With ordinary throttling and reset, there is comparatively little choice as to the form of stable control curves which may be gained, and a relatively long time is required after any given adjustment before the form of the resulting curve is sufficiently indicated on the chart to be a guide to further adjustment which may be required. With introduction of a rate of change function, in the manner which I have described, a much wider variety of control effects is enabled and, because of the rapidity with which the rate of change function affects the control results, the chart curves quickly show characteristic forms which greatly facilitate further adjustments. In practice, when cut and try methods are necessary in adjustment to unknown process conditions, I have ordinarily found it desirable at the outset to adjust the valve mechanism, as through pin 192 of Fig. 8, for rapid response, and the "ff" adjustment, as pin 36, to introduce a fairly high rate function. This will ordinarily cause excessive valve movement, and excess cut-off which will retard approach to control level. Without waiting for continued slow approach, the rate function may then be rapidly reduced to a point where undesirable overrun and slow cycling are just avoided and the valve operation may then be slowed until valve movement is smoothed out as desired. The whole may be accomplished in a fraction of the time required for adjustment of throttling and reset when these are controlled by departure alone.

Increasing amounts of lag to be overcome, ordinarily require a reduced rate of reset and a reduced amount of valve lead in relation to a given "ff" function, together with an increased proportion of rate function. By suitable relation of instrument proportions and values, interconnection of adjusting points may be effected in the manner which has been indicated so that adjustment at a single point will enable simultaneous adjustment of all values, with sufficient accuracy to satisfactorily meet a wide range of process lag conditions.

Separate adjustment of valve response may, however, be necessary to adapt the control mechanism to a large variation of process capacity. The suitable relation of rate and departure function appearing in the "ff" value is, to a considerable extent, determined by the amount of lag, while the amount and/or rate of change in corrective application which should result from a given "ff" value, is principally determined by the process capacity, and the resultant rate of change in the process condition which follows any given change in demand or corrective supply.

All of these factors may be quickly and accurately compensated by the methods of my invention, and apparatus such as that of Fig. 8, may be accurately calibrated so that when process conditions are known, the apparatus may be preadjusted to process requirements.

In the specifications and claims, certain brief words and phrases have been used, which should be broadly interpreted.

"Drum and wheel" should be understood to signify any suitable moving surface and any wheel or other means which moves on that surface in a line of minimum frictional resistance.

The basic principles of what I have termed the wheel and drum mechanism, may be included with a wide variety of variations in form of support of the wheel, and form of associated linkage to control or be controlled by movement of wheel on drum. I claim mechanisms embodying the principles here disclosed and claimed apart from the specific forms used for illustration.

The word "proportional" has been frequently used. Although one of the advantages of the wheel and drum mechanism lies in the fact that uniformly proportional response may be gained, when so desired, the word "proportional" has been ordinarily used in the wider sense of changes in approximate predetermined relation, and is intended to include modified as well as uniformly proportional relations.

In the claims it should be understood that change and/or rate of change in a measured condition, as it affects operation of the control mechanism, refers to values as indicated by the measuring means and such values ordinarily lag behind the true values.

I claim:

1. The combination of a moving surface, a wheel revolving in contact with but withheld from following the motion of said surface, means by which said wheel may follow its line of rolling contact lateral to the motion of said surface, when turned at an angle to the line of motion of said surface, a steering member connected to the support of said wheel in such manner that deflection of said steering member controls angle of said wheel with respect to the direction of motion of said surface, independent movable supporting means on which said wheel support and said steering member are together pivoted, means whereby said independent supporting means allows said wheel to follow its line of rolling contact lateral to the motion of said surface, and means whereby the angles of said steering arm and said wheel with respect to direction of motion of said moving surface are together automatically altered to values which cause lateral movement of said wheel to be a secondary measure of changes in a condition, as transmitted by a primary device responsive to said changes.

2. The combination as set forth in claim 1, together with an arm member connected to said steering member and said wheel support in such manner that said arm is deflected from a position parallel to the direction of movement of said surface in response to angular deflection of said wheel, but is substantially parallel to direction of motion of said surface when plane of rotation of said wheel is also parallel, the lateral position of said arm with respect to the direction of motion of said surface varying with that of said wheel.

3. The combination as set forth in claim 1 together with means for applying a corrective to the measured condition, and means whereby application of said corrective is jointly responsive through connected members to both the lateral position of said wheel with respect to said moving surface and to the angle of said wheel with respect to the direction of motion of said surface.

4. The combination as set forth in claim 1, together with a controlling member connected to said steering arm, the connection being such that when said controlling member is in median position the wheel turns in a plane parallel to the direction of motion of said surface and does not move laterally with respect to said surface, and when said controlling member is moved from median position the angle and rate of lateral motion of said wheel with respect to direction of motion of said surface are substantially proportional to the amount of deflection from median position of point on said control member which is connected to said steering member.

5. In combination, a wheel revolving in contact with a moving surface and held by supporting bearing structure which is pivoted in a supporting arm, said supporting arm at another point being mounted on a fixed pivot, a steering arm attached to supporting bearing structure of said wheel and approximately normal to the plane of rotation of said wheel, a control link pivoted at one end on a point on said steering arm and pivoted at the other end on a point on a control member from which angular deflection of the wheel with respect to the direction of motion of said surface is regulated, the said four pivot points being so located with respect to each other and having such relative movement as to substantially constitute the corners of a parallelogram in all positions.

6. The combination as set forth in claim 5 together with measuring means responsive to changes in a controlled condition, means whereby a corrective may be applied to such controlled condition, means responsive to rate of change of the controlled condition, means jointly responsive to value and rate of change of said condition, means whereby the deflection from median position of the member which acts through said link, to control angle of said wheel with respect to said moving surface, is responsive to said combined function of value and rate of change of the controlled condition, and means whereby said corrective application is varied in a proportional relation to the lateral position of said wheel with respect to said moving surface.

7. The combination as set forth in claim 5, together with measuring means responsive to changes in a controlled condition, means whereby a corrective may be applied to said controlled condition, means responsive to rate of change in the controlled condition, means jointly responsive to value and rate of change of said condition, means whereby the deflection from median position of the member which acts through said link to control angle of said wheel with respect to said moving surface is responsive to said combined function of value and rate of change of the controlled condition, and means whereby said corrective application is varied in a proportional relation to the lateral position of said wheel with respect to said moving surface, and means whereby the amount of said corrective application is further increased or decreased by an amount which is in a proportional relation to a combined function of value and rate of change of the controlled condition.

8. In combination, a revolving drum, a wheel in rolling contact with said drum, measuring means responsive to changes in a controlled condition, means responsive to rate of change in said condition, means responsive to combined functions of value and rate of change of said condition, means whereby angle of said wheel with respect to direction of motion of the surface of said drum may be varied in response to value of said combined functions, means for applying a corrective to the controlled condition, a member the movement of which is responsive both to value of said combined functions, and to position of said wheel lateral to said drum, and means whereby said corrective application is varied in proportional relation to movement of a point on said member.

9. In combination means responsive to changes in a controlled condition, a revolving drum, a wheel in rolling contact with said drum, a moveable support for said wheel, connection between said support of said wheel and said measuring means, means responsive both to movement of said support and to said measuring means, whereby angle of said wheel is varied as necessary to maintain position of said wheel support in predetermined relation to value indicated by said measuring means, means responsive in part to position of said wheel support and in part to angle of said wheel, connected means responsive to said combined response, a second wheel in rolling contact with a revolving drum, means whereby angle of said second wheel is varied responsively to said combined function, means for varying a corrective application to the controlled condition, and means whereby said corrective application is varied in response to movement of said second wheel.

10. In automatic control of one process condition in which the amount of lag requiring control correction varies as a function of a second process condition, the combination of means responsive to changes in value of the first condition, means responsive to rate of change of value of the first condition, corrective means responsive to a combined function of said values and rate of change, and means responsive to changes in said second condition which increase or decrease the proportion of said rate of change measure appearing in said combined function in substantially predetermined relation to the amount of said lag.

CLARK M. DENNIS.